(12) United States Patent
Beranek

(10) Patent No.: US 9,930,964 B2
(45) Date of Patent: Apr. 3, 2018

(54) SHELF

(71) Applicant: Gerald Beranek, North Liberty, IA (US)

(72) Inventor: Gerald Beranek, North Liberty, IA (US)

( * ) Notice: Subject to any disclaimer, the term of this patent is extended or adjusted under 35 U.S.C. 154(b) by 0 days.

(21) Appl. No.: 15/351,780

(22) PCT Filed: May 15, 2015

(86) PCT No.: PCT/US2015/031057
§ 371 (c)(1),
(2) Date: Nov. 15, 2016

(87) PCT Pub. No.: WO2015/175924
PCT Pub. Date: Nov. 19, 2015

(65) Prior Publication Data
US 2017/0119155 A1    May 4, 2017

Related U.S. Application Data

(60) Provisional application No. 61/993,470, filed on May 15, 2014.

(51) Int. Cl.
*G03B 17/00* (2006.01)
*A47B 96/02* (2006.01)
*F16M 13/02* (2006.01)
*F16M 11/04* (2006.01)
*G03B 17/56* (2006.01)

(52) U.S. Cl.
CPC .......... *A47B 96/022* (2013.01); *A47B 96/021* (2013.01); *F16M 11/041* (2013.01); *F16M 13/025* (2013.01); *G03B 17/561* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,014,892 A | * | 5/1991 | Copeland | A45F 5/02 224/242 |
| 2007/0292125 A1 | * | 12/2007 | Saxton | G03B 17/563 396/420 |
| 2015/0177597 A1 | * | 6/2015 | Harrison | G03B 17/561 396/419 |

* cited by examiner

*Primary Examiner* — Minh Phan
(74) *Attorney, Agent, or Firm* — David M. Breiner; BrownWinick Law Firm

(57) ABSTRACT

Disclosed is a shelf having a slanted base. In example embodiments the base may include a protrusion configured to engage an electronic device, such as, but not limited to, a camera. Example embodiments also relate to a system having the shelf and the electronic device.

5 Claims, 15 Drawing Sheets

SHELF

CROSS-REFERENCE TO RELATED APPLICATIONS

This application claims the benefit of U.S. Patent Cooperation Treaty Application No. PCT/US2015/031057 filed with the United States Patent and Trademark Office on May 15, 2015, as well as U.S. Provisional Application No. 61/993,470 filed with the United States Patent and Trademark Office on May 15, 2014, the entire contents of which is hereby incorporated by reference.

BACKGROUND

1. Field

Example embodiments relate to shelf having a slanted base. In example embodiments the base may include a protrusion configured to engage an electronic device, such as, but not limited to, a camera. Example embodiments also relate to a system having the shelf and the electronic device. Example embodiments also relate to a shelf having a slanted base with an aperture into which an adapter may be inserted. Example embodiments also relate to a mount having a body with an aperture into which a protrusion extends. In this latter embodiment one side of the body may include an adhesive to attach the body to a structure, for example, a wall.

2. Description of the Related Art

FIG. 1 is a view of a conventional shelf 100. The shelf 100 has a triangular end 110 so as to be insertable into a corner of a room 10. The shelf 100 is attached to the walls of the room 10 via a pair of brackets 120 and 130. In the conventional art, such a shelf is useful for placing or displaying several different types of articles. For example, the shelf 100 may be used to display a decorative article, such as a trophy, or may be used to store a more functional article, for example, a clock.

FIG. 2 is a view of a camera 200 supported on the shelf 100. In the conventional art, the camera 200 may be used for several purposes, for example, to monitor an activity within a room. Some consumers, for example, buy the camera 200 to monitor a baby in a crib. In such a system, the camera 200 may transmit images of the baby to a television set, a video monitor, or a computer so that the baby may be monitored by a parent and/or a caregiver without the parent and/or caregiver having to be in the same room as the baby.

SUMMARY

The inventors have noted that when a conventional shelf is used to support a camera for the purpose of monitoring a baby in a crib, the shelf typically does not allow the camera to peer directly in the crib. As such, the inventors set out to design a new shelving system which allows a camera to be mounted thereon in a manner that allows the camera to peer into a baby's crib. As a result, the inventors have developed a new an nonobvious shelf along with a new and nonobvious system for monitoring a baby's crib. The invention, however, is not limited to merely a monitoring a baby's crib. For example, the invention may be used to monitor various items within a room in a manner not allowed by conventional shelves.

Example embodiments relate to shelf having a slanted base. In example embodiments the base may include a protrusion configured to engage an electronic device, such as, but not limited to, a camera. Example embodiments also relate to a system having the shelf and the electronic device.

In accordance with example embodiments, a shelf may include at least one sidewall and a base inclined with respect to the at least one sidewall, wherein the base includes a protrusion. In example embodiments, the protrusion may have a base of about 0.5 inches or less and a height of about 0.5 inches or less. In the alternative, the protrusion may resemble a cylinder having a diameter of about 0.5 inches or less.

BRIEF DESCRIPTION OF THE DRAWINGS

Example embodiments are described in detail below with reference to the attached drawing figures, wherein.

DETAILED DESCRIPTION

Figure 1:
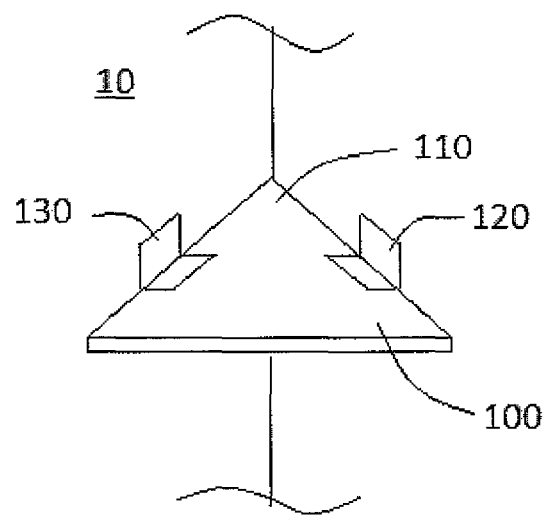
FIG. 1 is a perspective view of a shelf in accordance with the conventional art.
Figure 2:
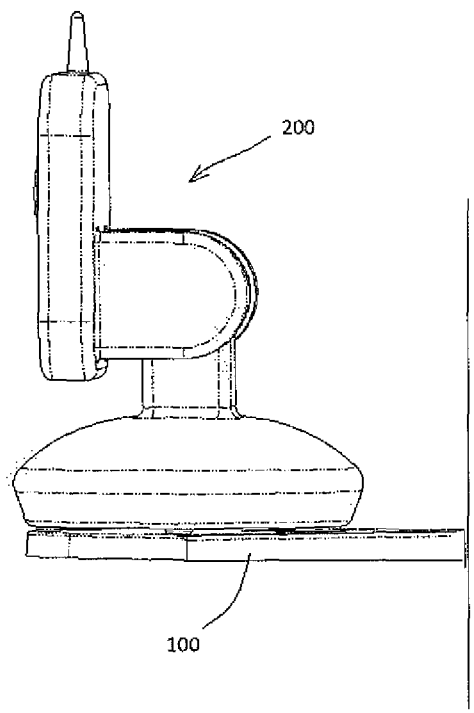
FIG. 2 a side view of the conventional shelf with a monitor mounted thereon.

Example embodiments will now be described more fully with reference to the accompanying drawings, in which example embodiments of the invention are shown. The invention may, however, be embodied in different forms and should not be construed as limited to the example embodiments set forth herein. Rather, these example embodiments are provided so that this disclosure will be thorough and complete, and will fully convey the scope of the invention to those skilled in the art. In the drawings, the sizes of components may be exaggerated for clarity.

In this application, it is understood that when an element or layer is referred to as being "on," "attached to," "connected to," or "coupled to" another element or layer, it can be directly on, directly attached to, directly connected to, or directly coupled to the other element or layer or intervening elements that may be present. In contrast, when an element is referred to as being "directly on," "directly attached to," "directly connected to," or "directly coupled to" another element, there are no intervening elements present. As used herein, the term "and/or" includes any and all combinations of one or more of the associated listed items.

In this application it is understood that, although the terms first, second, etc. may be used herein to describe various elements and/or components, these elements and/or components should not be limited by these terms. These terms are only used to distinguish one element, component, region, layer, and/or section from another elements, component, region, layer, and/or section. Thus, a first element, component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to planform views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to shelf having a slanted base. In example embodiments the base may include a protrusion configured to engage an electronic device, such as, but not limited to, a camera. Example embodiments also relate to a system having the shelf and the electronic device.

Figure 3A:
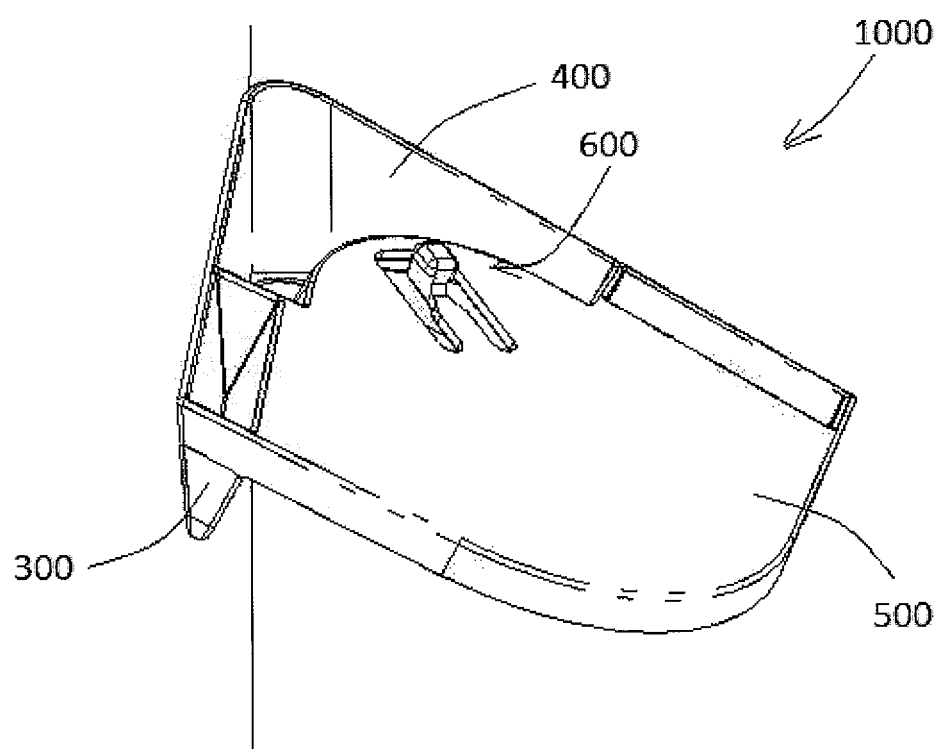
FIGS. 3A-3B are views of a shelf in accordance with example embodiments.
Figure 3B:
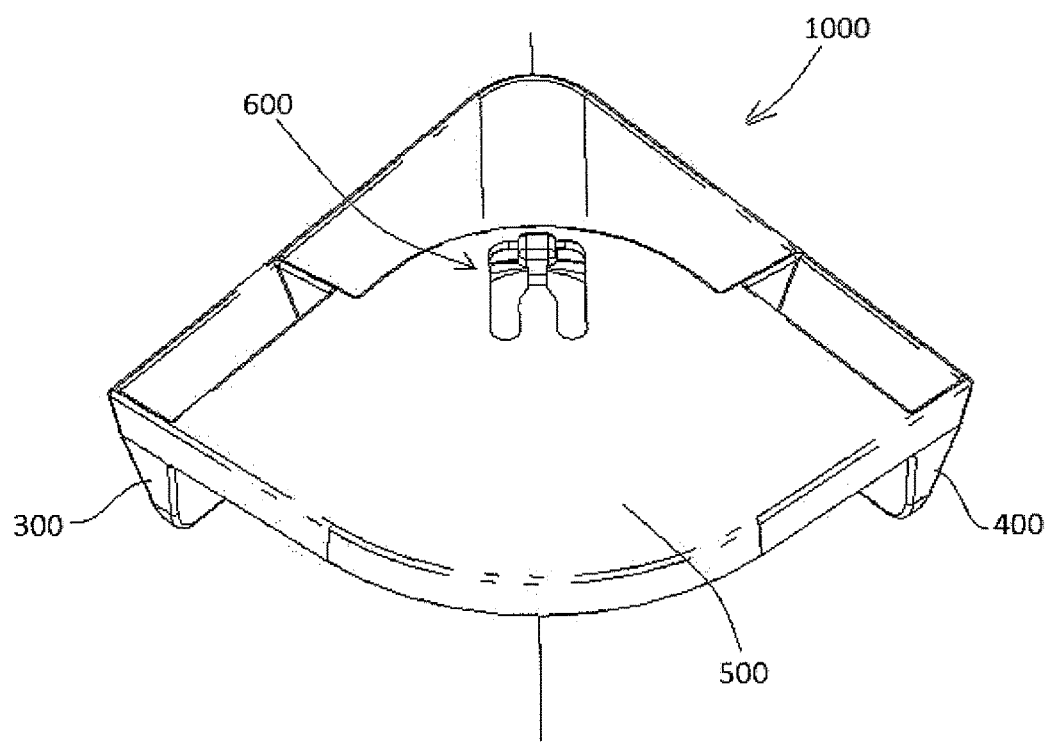
Figure 4A:
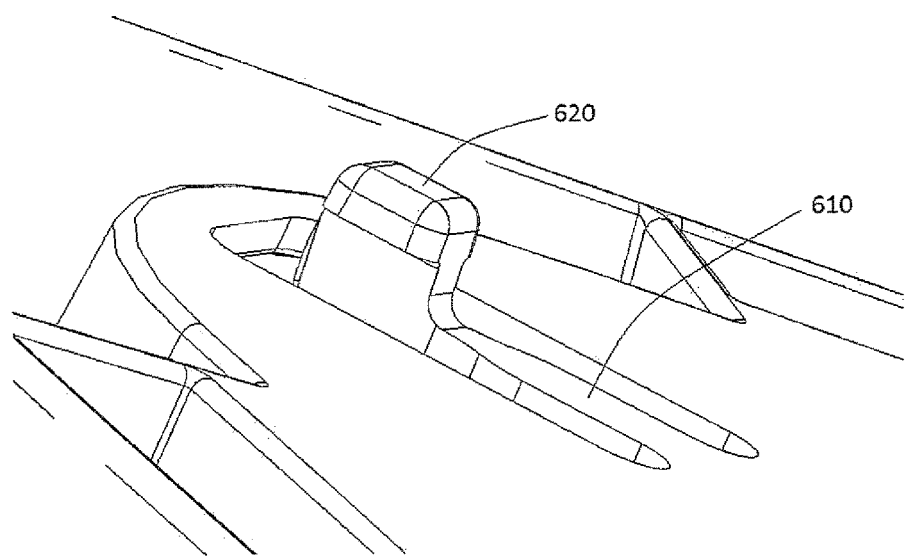
FIGS. 4A-4C are views of a protrusion in accordance with example embodiments.
Figure 4B:
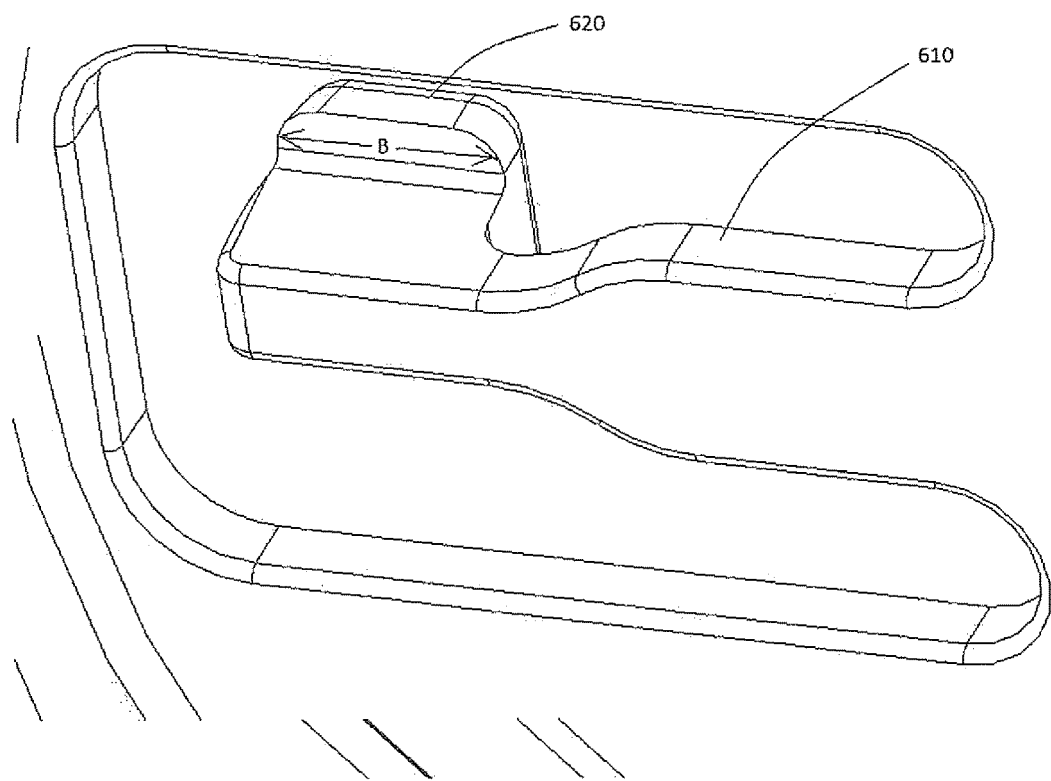
Figure 4C:
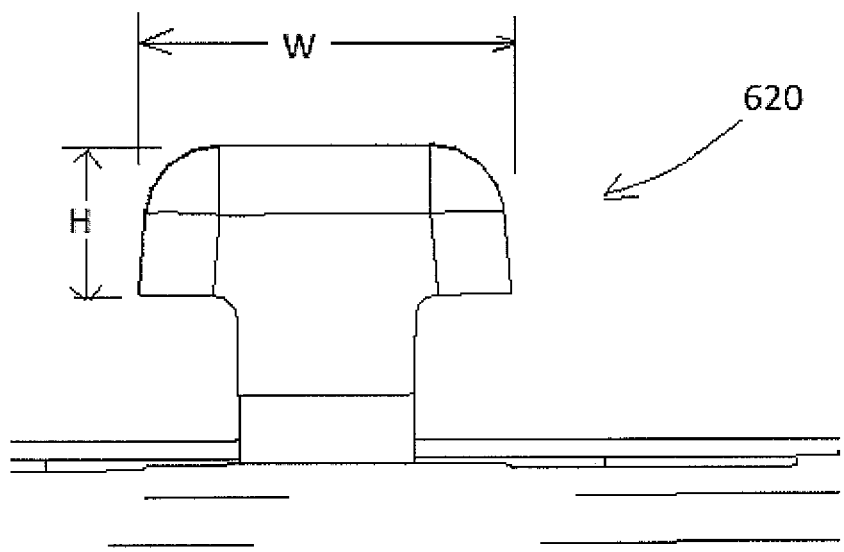

FIGS. 3A-3B are views of a shelf 1000 in accordance with example embodiments. As shown in FIGS. 3A-3B the shelf 1000 may include a first side wall 300, a second side wall 400, and a base 500. In example embodiments, when viewed from a top of shelf 1000, the first and second sidewalls 300 and 400 may be perpendicular to each other. As a consequence, the first and second sidewalls 300 and 400 may allow the shelf 1000 to fit into a corner of a room 10. The invention, however, is not limited to first and second sidewalls 300 and 400 being perpendicular to each other. For example, in some embodiments, the sidewalls 300 and 400 may form an angle greater than ninety degrees or less than ninety degrees to aid in installing the shelf 1000 in corners that are not formed from perpendicularly oriented walls. In example embodiments, when the shelf 1000 is inserted into a corner of a room 10, the base 100 is slanted with respect to the horizontal. The slant angle θ may be as little as 10 degrees but could be as much as 85 degrees.

In example embodiments, a protrusion 600 may protrude from an upper surface of the base 500. In example embodiments, the protrusion 600 may be formed as a J-shaped tongue 610 having a flange 620 at an end thereof. This, however, is not intended to limit the invention. For example, rather than having a tongue 610 with a flange 620, the protrusion 600 may simply resemble a bump extending from the base 500. In the alternative, the protrusion 600 may be formed of a screw or some other member that attaches to the base 500 and/or protrudes from the base 500.

In example embodiments, an elevation of the flange 620 with respect to the base 500 may be adjusted by bending the tongue 610 upwards or downwards with respect to the base 500. As such, the protrusion 600 has some built in adjustability. Thus, the protrusion 600 may be used to attach to, or interface with, various different types of electronic devices having apertures at different elevations.

Figure 5A:
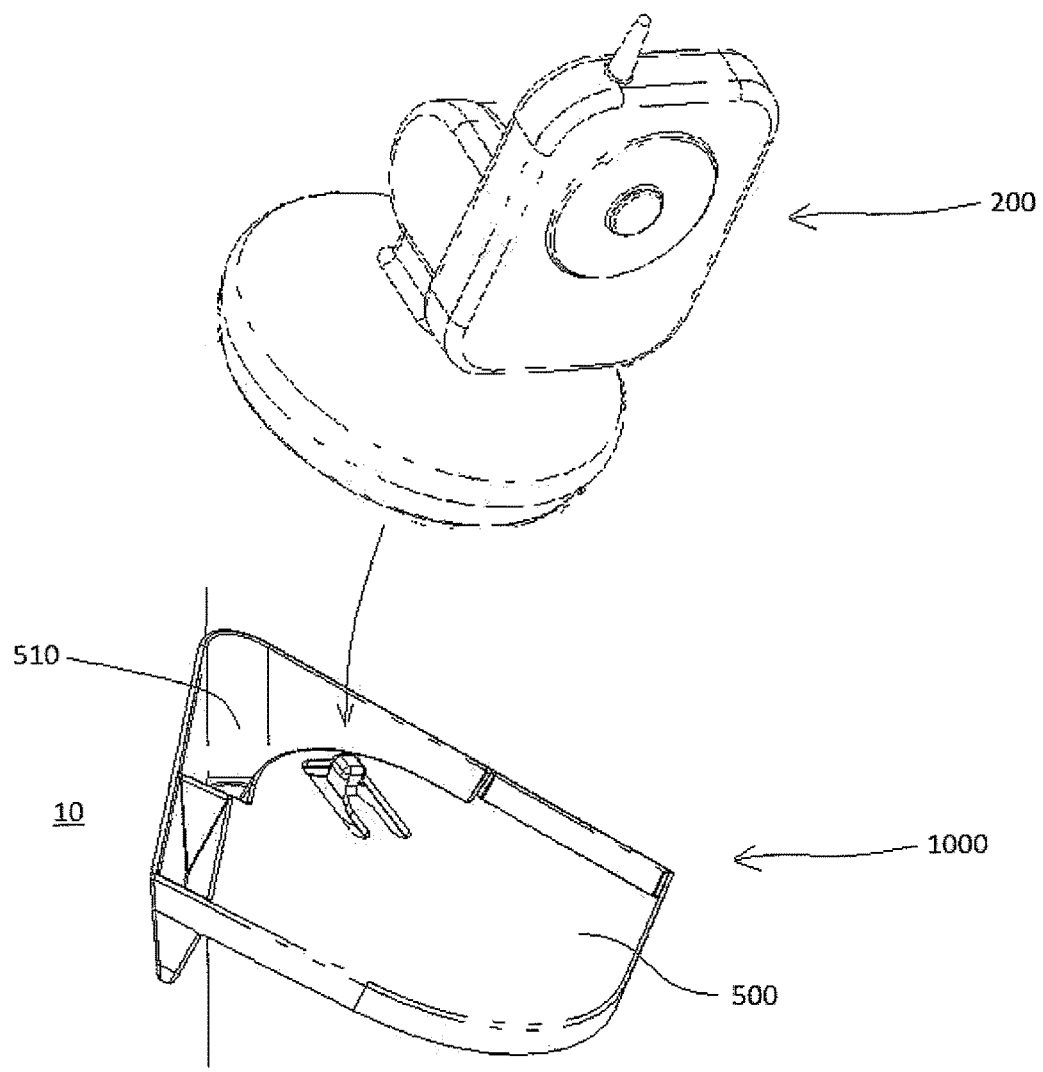
FIGS. 5A and 5B are views of a system in accordance with example embodiments.
Figure 5B:
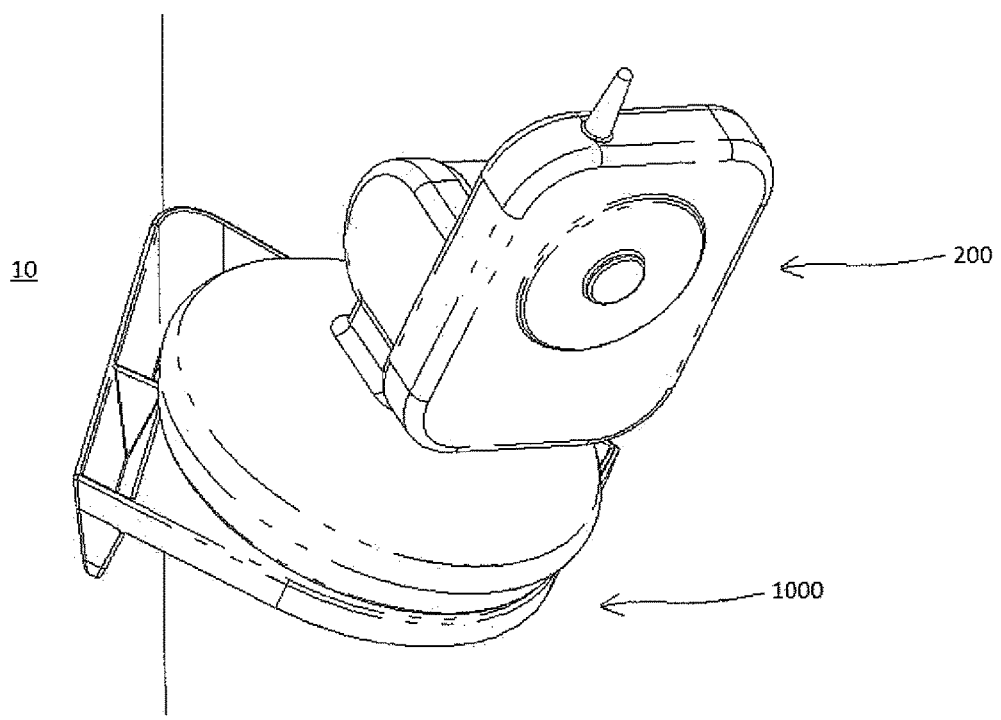

In example embodiments, the shelf 1000 may be used to support an electronic device, for example, a camera. For example, FIG. 5A illustrates the shelf 1000 attached to a corner of a room 10. In example embodiments, a camera 200 having an aperture formed in a base thereof may be may be placed on the base 500 such that the protrusion 600 inserts into the aperture of the camera 200. As such, because the protrusion 600 of the base 500 is inserted into the aperture of the camera 200, the camera 200 is unable to slide off the base 500 despite the base being inclined from the horizontal.

In example embodiments, the base 500 may include an opening 510 at a back thereof. The opening 510 may allow a power cord of the electronic device to pass therethrough. For example, in the event the electronic device is an electronic camera 200, a cord of the camera may pass through the opening 510 thus allowing the cord to be routed through the shelf 1000.

In example embodiments, the shelf 1000 may be attached to a corner of a room 10 by conventional means. For example, in example embodiments, the shelf 1000 may be attached to a corner of a room by applying an adhesive to the outer surfaces of the walls 300 and 400. On the other hand, the walls 300 and 400 may be formed with holes allowing the walls to be secured to walls of a room 10 using screws.

Figure 6A:
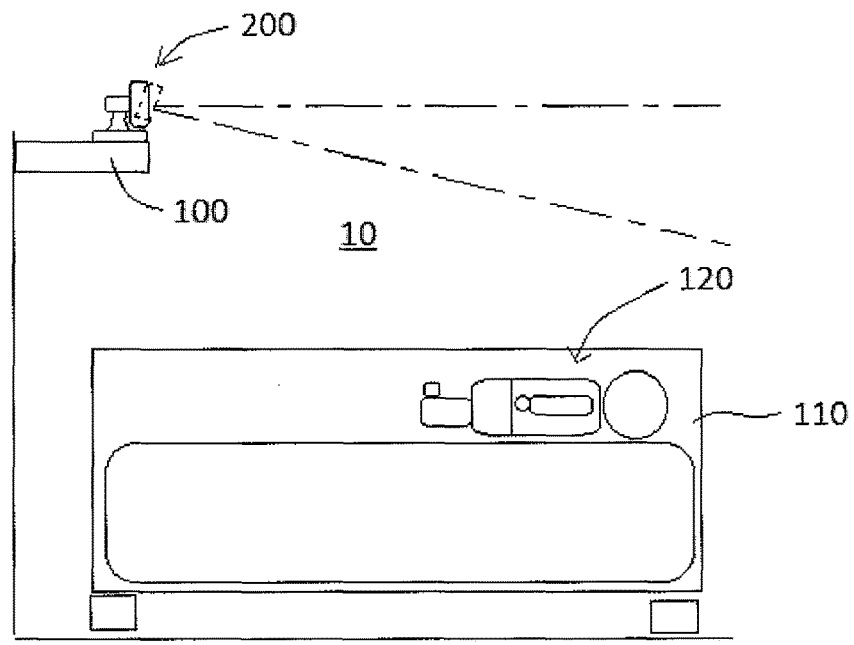
FIGS. 6A and 6B are views of the a room having a conventional shelf system and a shelf system in accordance with example embodiments.
Figure 6B:
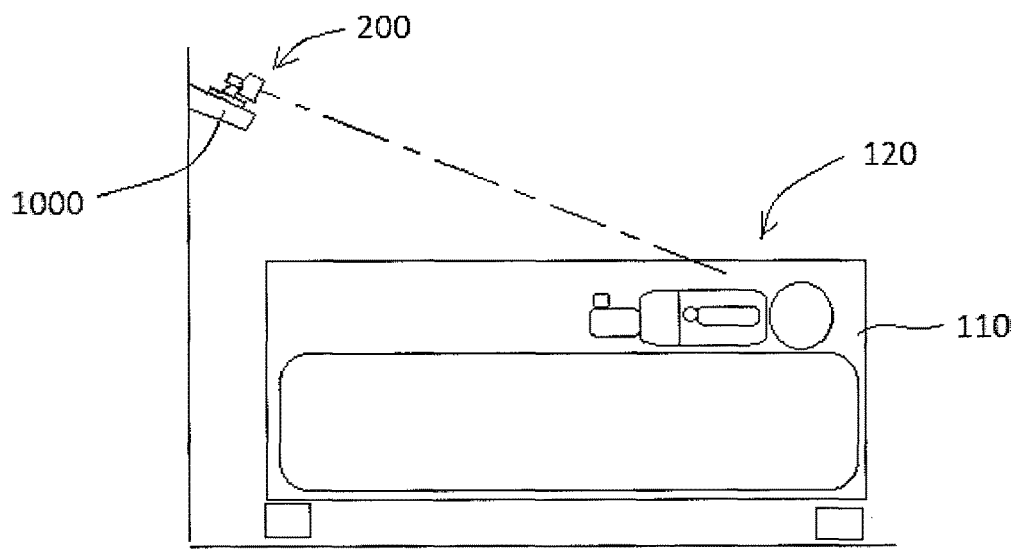

FIGS. 6A and 6B illustrate a camera 200 mounted on a conventional corner shelf 100 and a camera 200 mounted on a shelf 1000 in accordance with example embodiments. In example embodiments, the shelf 100 may be mounted in a corner of a room having a crib 110 and a baby 120 therein. As shown in FIG. 6A, the camera 200 mounted on the conventional shelf 100 does not directly view the baby 120 in the crib 110, even if the camera 200 is adjusted downward. However, in example embodiments, because the camera 200 is mounted on the shelf 1000 having the slanted base 500, the camera 200 may directly view the baby 120 in the crib 110. As such, the shelf 1000 of example embodiments allows for a viewing of a baby 120 in a manner not provided for in the conventional art.

In example embodiments, the size of the protrusion 600 may be controlled by the electronic device to which it is to attach. Some conventional cameras, for example, have a rectangular aperture in a bottom thereof having a base of about 0.5 inches and a width of about 0.5 inches. As such, the protrusion 600 may have a rectangular shaped flange having a base B of about 0.5 inches or less and a width W of about 0.5 inches or less. On the other hand, other conventional cameras have circular openings having a diameter of about 0.5 inches. For these cameras the protrusion 600 may resemble a cylinder having a diameter of about 0.5 inches or less. As yet another example, the protrusion and the camera may be designed so the protrusion 600 and the aperture of the camera may function as a snap-type connection.

Figure 7:
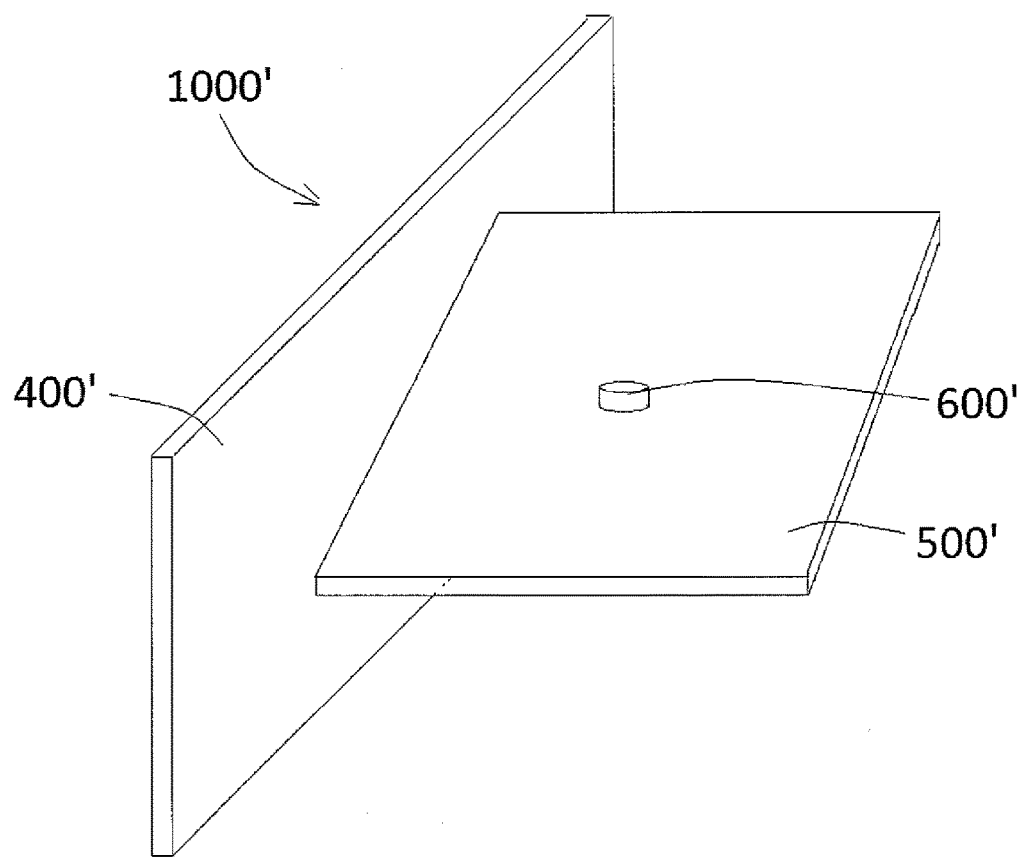
FIG. 7 is a view of another shelf in accordance with example embodiments

Although example embodiments thus far have described a shelf 1000 having a protrusion 600, the invention is not limited thereto. For example, in another embodiment, Velcro type material may be applied to an upper surface of the base 500 and a lower surface of the electronic device so that the electronic device may be easily attached to the base 500 without having to rely on a protrusion for securing an electronic device on the shelf 1000. Also, in example embodiments, the shelf 1000, rather than having two side walls 300 and 400, may have one side wall omitted. In another embodiment, as shown in FIG. 7, a shelf 1000' may be constructed using a single side wall 400' and a slanted base 500' with a protrusion 600' (which may be substantially identical to the protrusion 600). This latter embodiment may be useful in the event it is desired to support an electronic device, for example, a camera, on a wall rather than at a corner. As yet another example, the shelf 1000 may include multiple protrusions rather than a single protrusion 600 as illustrated in the figures. In this latter example, the shelf 1000 may accommodate an electronic device having multiple apertures formed at a bottom thereof. In the alternative, an adapter may be created to attach the electronic device to the base 500. As yet another example, the protrusion 600 may be elongated to resemble a wall type structure along a front of the base 500. This wall type structure may prevent an electronic device from slipping off the base 500.

In example embodiments, the shelf 1000 may be made from various materials and by various processes. For example, in example embodiments the shelf 1000 may be made by printing process (for example, 3D printing) or a casting process. Thus, in example embodiments, the shelf 1000 may be a substantially integral structure. On the other hand, various portions of the shelf 1000 may be independently formed and then connected together to form the shelf 1000. For example, each of the first and second side walls and base 500 may be independently formed and then connected together by a conventional means such as, but not limited to, gluing, welding, or using fasteners such as screws and/or clips. As for the materials, the shelf 1000 may be fabricated from wood, metal, a ceramic, a plastic, or any combination thereof.

Figure 8:
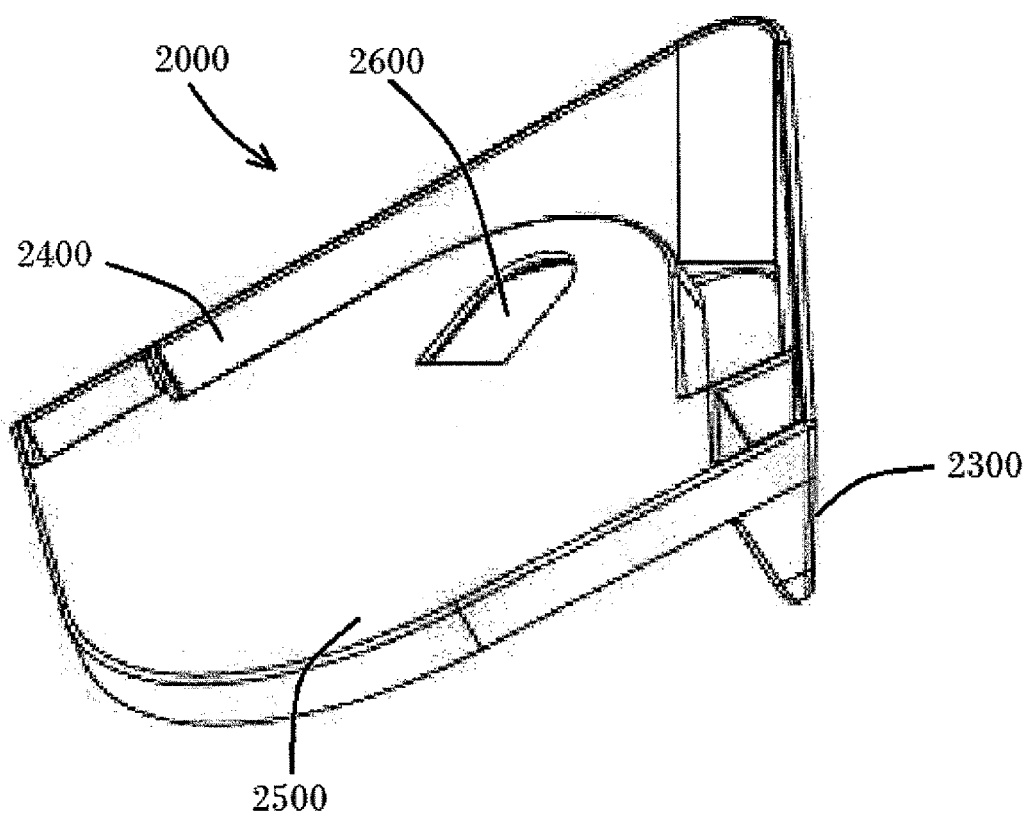
FIG. 8 is a view of another shelf in accordance with example embodiments.

FIG. 8 is view of another shelf 2000 in accordance with example embodiments. The shelf 2000 may be substantially similar to the shelf 1000 in that it has a first sidewall 2300 and a second sidewall 2400 supporting a base 2500. In fact, these features of the shelf 2000 may be substantially identical to the first sidewall 300, the second sidewall 400, and the base 500 of shelf 1000, as such, a detailed explanation thereof is omitted for the sake of brevity. However, a difference between shelf 1000 and shelf 2000 is that the base 2500 of shelf 2000 includes an aperture 2600 rather than a protrusion 600 as is present in shelf 1000. In example embodiments, the aperture 2600 may be configured to allow an adapter 3000 to attach to the base 2500 of the shelf 2000.

Figure 9A:
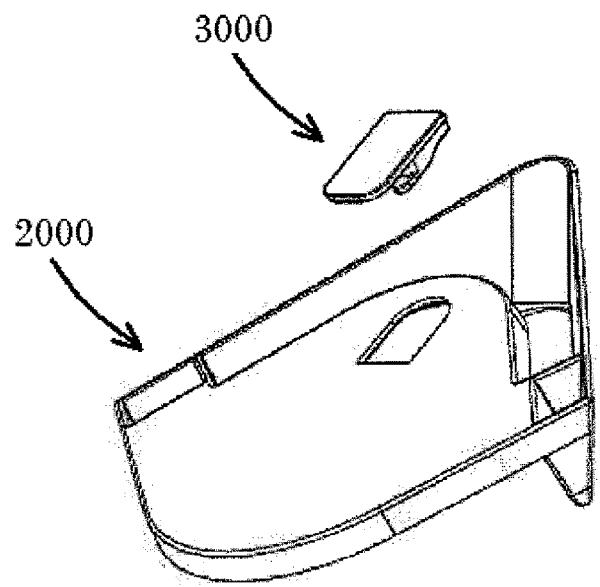
FIGS. 9A and 9B illustrate a shelf and an adapter in accordance with example embodiments.
Figure 9B:
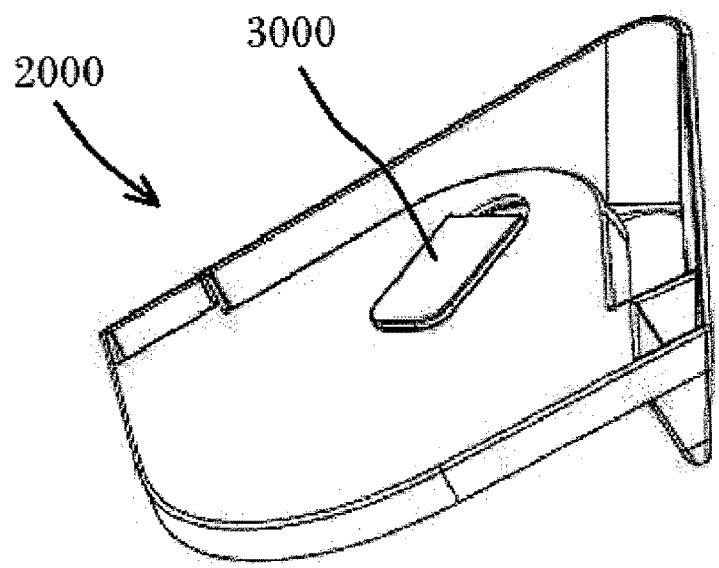
Figure 10A:
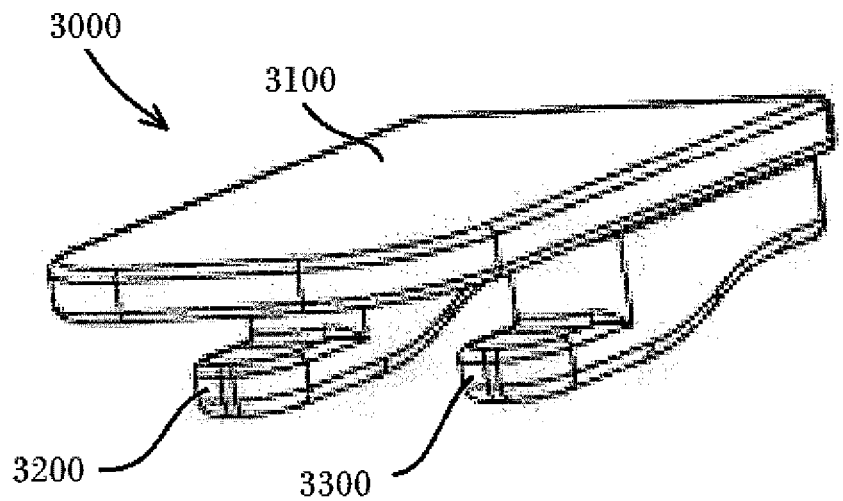
FIGS. 10A-10E illustrate various views of an adapter in accordance with example embodiments.
Figure 10B:
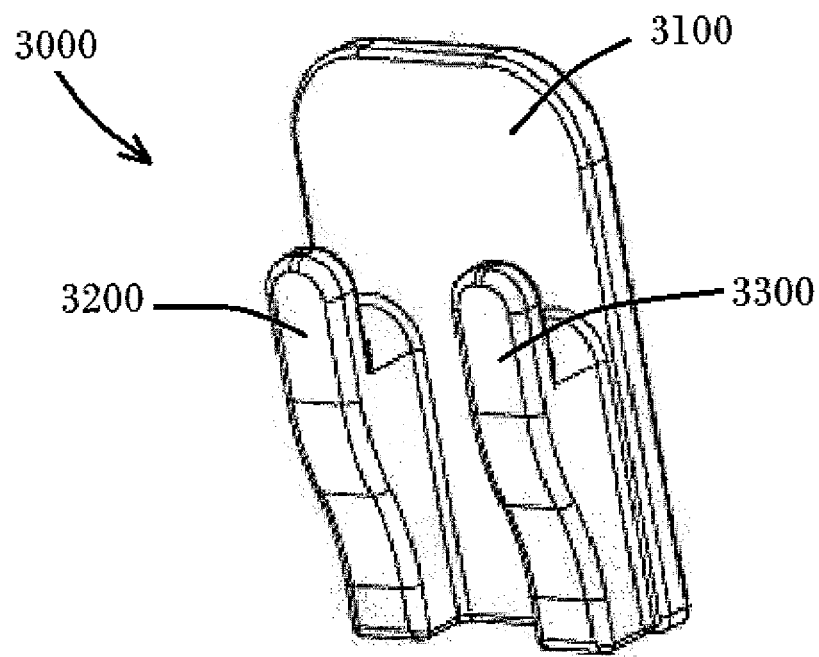
Figure 10C:
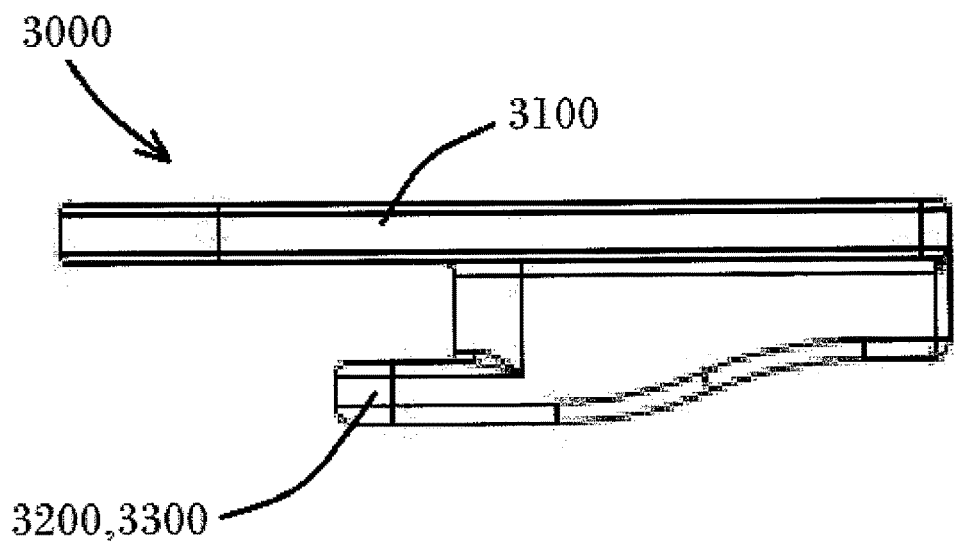
Figure 10D:
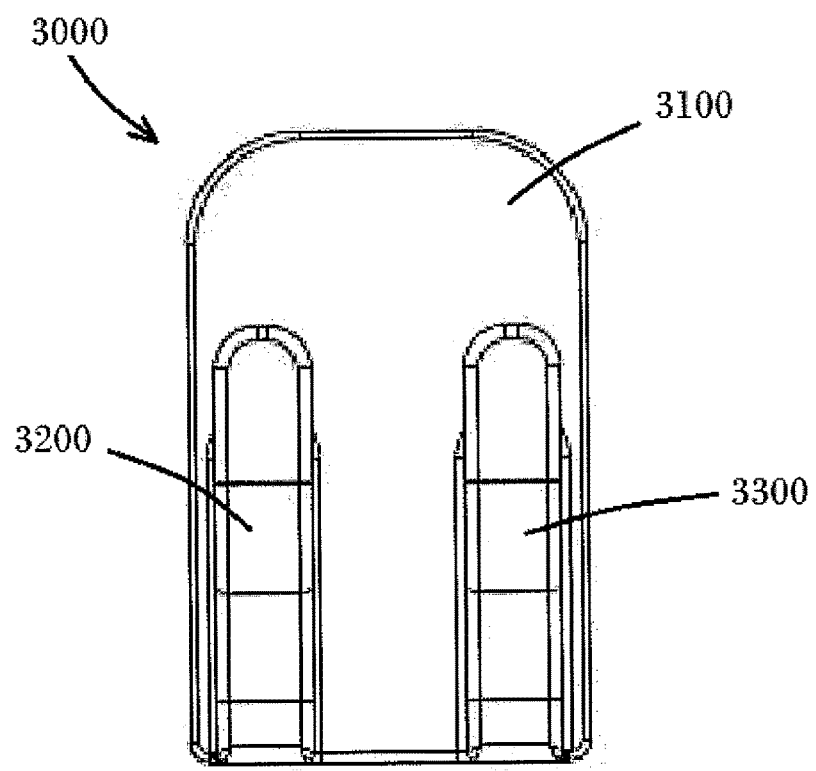
Figure 10E:
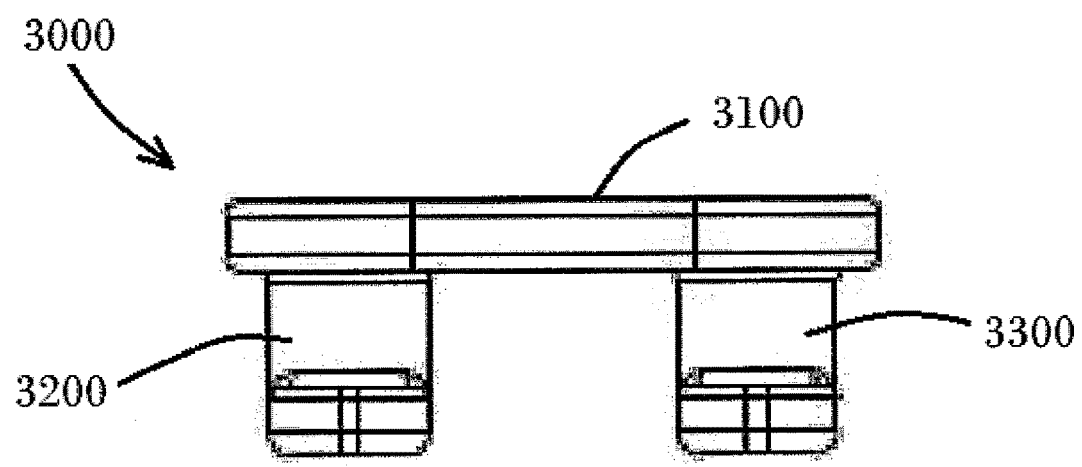

FIGS. 9A and 9B illustrate the shelf 2000 with the adapter 3000. As shown in FIG. 9A, the adapter 3000 may be arranged near the aperture 2600 and actually connected to the base 2500 by at least partially inserting the adapter 3000 in to the aperture 2600 as shown in FIG. 9B. In example embodiment, the adapter 3000 may be used to fix various devices to the shelf 2000. For example, the adapter 3000 may be attached to a bottom of a video camera. In this particular nonlimiting example embodiment, the devices may be removably attached to the shelf 2000 via the adapter 3000.

FIGS. 10A-10E illustrate various views of the adapter 3000 in accordance with example embodiments. It is understood the adapter 3000 may be embodied in various forms. As such, the particular form of the adapter 3000 is not meant to limit the scope of this invention.

Referring to FIGS. 10A-10E, the adapter 3000 may be comprised of a substantially flat member 3100 which may resemble a plate. The adapter 3000 may also include at least on securing member. In the nonlimiting example of FIGS. 10A-10E the adapter 3000 is illustrated as having a first securing member 3200 and a second securing member 3300 which may aid in securing the adapter 3000 to the shelf 2000. However, the adapter 3000 may be embodied differently. For example, rather than having two securing members 3200 and 3300 the adapter 3000 may have three or more securing members or a single securing member. Regardless, the at least one securing member should be configured to secure the adapter 3000 to the shelf 2000.

In example embodiments the securing members 3200 and 3300 may resemble L shaped members having feet 3210 and 3310. In one embodiment, surfaces of the feet 3210 and 3310 facing the substantially flat member 3100 may be separated from a bottom surface of the substantially flat member 3100 by a distance t which may be substantially equal to the thickness of the base 2500. In the event the distance t is slightly smaller than the thickness of the base 2500 securing members 3200 and 3300 should be made of a flexible material, for example, plastic, rubber, etc., to allow the securing members 3200 and 3300 to flex. Regardless of the material used to manufacture the adapter 3000, the securing members 3200 and 3300 of the adapter 300 may be inserted into the aperture 2600 of the shelf 2000 and moved so that a portion of the base 2500 is sandwiched between a bottom surface of the substantially flat member 3100 and the top surfaces of the feet 3210 and 3310 to secure the adapter 3000 to the shelf 2000.

Figure 11:
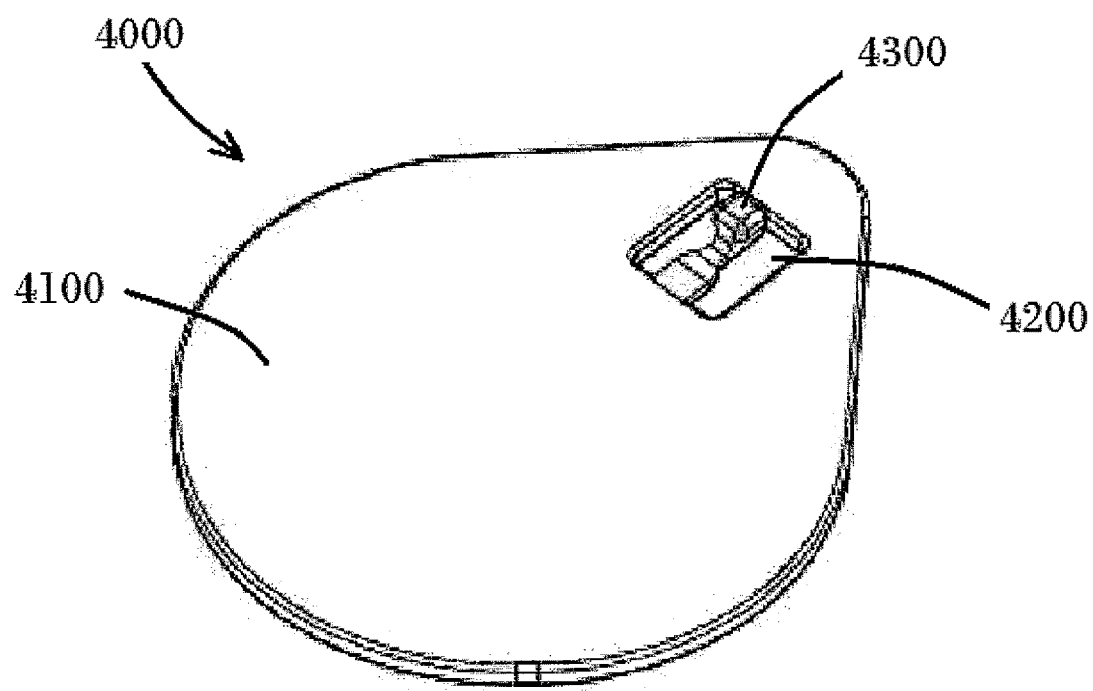
FIG. 11 illustrates a view of a mount in accordance with example embodiments.

FIG. 11 is view of a mount 4000 in accordance with example embodiments. The mount 4000 may include a body 4100 with an aperture 4200 and a protrusion 4300 extending into the aperture 4200. In example embodiments a back side of the body 4100 may have the adhesive applied thereto and the body 4100 may be attached to a wall via the adhesive. In example embodiments the protrusion 4300 may be substantially identical to the previously described protrusion 600, therefore, a description thereof is omitted for the sake of brevity. In example embodiments, the protrusion 4300 may be used to attach a device, for example, a video camera, to the mount 4000. Thus, in example embodiments the mount 4000 may be used to attach a camera to a wall.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What is claimed is:
1. A system comprising:
   a shelf having a first sidewall, a second side wall, and a base inclined with respect to the first and second sidewalls so that when installed in a corner of a room, the first and second side walls are flush with walls forming the corner of the room and the base forms an angle from the horizontal of about 10 to about 85 degrees, wherein the base includes an aperture;

an adapter configured to at least partially insert into the aperture and having a substantially flat interfacing member and at least one fixing member configured to sandwich the base;

a camera on the base, wherein the camera is inclined from the horizontal due to the base being inclined from the horizontal; and wherein the camera is attached to the adapter.

2. The system of claim 1, wherein the first and second sidewalls extend from a bottom of the base.

3. The system of claim 2, wherein the first side wall and the second sidewall are substantially perpendicular to one another.

4. The system of claim 1, further comprising an adhesive between the adapter and the camera.

5. The system of claim 1, further comprising an adhesive on outer surfaces of the first and second sidewalls to secure the first and second sidewalls to the walls forming the corner of the room.

* * * * *